United States Patent
Swart et al.

(10) Patent No.: US 6,777,825 B1
(45) Date of Patent: Aug. 17, 2004

(54) DATA TRANSMISSION METHOD AND SYSTEM IN A MOTOR VEHICLE OCCUPANT PROTECTION SYSTEM

(75) Inventors: Marten Swart, Obertraubling (DE); Christian Zelger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,848
(22) PCT Filed: Mar. 1, 2000
(86) PCT No.: PCT/DE00/00619
§ 371 (c)(1),
(2), (4) Date: Sep. 4, 2001
(87) PCT Pub. No.: WO00/52878
PCT Pub. Date: Sep. 8, 2000

(30) Foreign Application Priority Data

Mar. 4, 1999 (DE) .......................................... 199 09 535

(51) Int. Cl.⁷ .................... G05B 23/02; H04L 12/403
(52) U.S. Cl. ................... 307/10.1; 340/3.1; 370/451
(58) Field of Search .............................. 307/10.1, 451, 307/459, 461; 340/3.1; 713/320, 321

(56) References Cited

U.S. PATENT DOCUMENTS

| | | | |
|---|---|---|---|
| 4,965,550 A | * 10/1990 | Wroblewski | ............. 340/524 |
| 5,130,983 A | 7/1992 | Heffner, III | |
| 5,196,728 A | * 3/1993 | Jaux | ............. 307/10.1 |
| 5,297,144 A | 3/1994 | Gilbert et al. | |
| 5,347,515 A | 9/1994 | Marino | |
| 5,351,041 A | * 9/1994 | Ikata et al. | ............. 340/825.24 |

FOREIGN PATENT DOCUMENTS

| | | |
|---|---|---|
| EP | 0 495 600 A1 | 7/1992 |
| EP | 0 507 581 A1 | 10/1992 |

OTHER PUBLICATIONS

Patent Abstracts of Japan. vol. 005, No. 133 (E–071) Aug. 25, 1981.

* cited by examiner

Primary Examiner—Gregory J. Toatley, Jr.
(74) Attorney, Agent, or Firm—Morrison & Foerster LLP

(57) ABSTRACT

According to the invention, impact sensors are repeatedly interrogated during a polling mode and have to actively reply by emitting current pulses. If a sensor does not reply it is selectively addressed and can at that point signal a desired message. The master unit has full communications control over the bus so that data collisions can be avoided and very rapid transmission of the sensor signal is achieved. The master unit can change the communication priorities at any time.

11 Claims, 1 Drawing Sheet

DATA TRANSMISSION METHOD AND SYSTEM IN A MOTOR VEHICLE OCCUPANT PROTECTION SYSTEM

CLAIM FOR PRIORITY

This application claims priority to International Application No. PCT/DE00/00619 which was published in the German language on Sep. 8, 2000.

TECHNICAL FIELD OF THE INVENTION

The invention relates to a data transmission method and system, and in particular, to a data transmission method and system in a motor vehicle occupant protection system.

BACKGROUND OF THE INVENTION

EP 0 507 581 A1 discloses a data transmission system in which multiplex nodes are connected to a common bus line. In order to update the system, the multiplex nodes can transmit specific protocol words which comprise a data segment specifying a multiplex node group, and a confirmation signal segment. During the confirmation signal segment, each addressed multiplex node which is associated with the selected group can emit a confirmation signal. If all of the addressed multiplex nodes reply with a confirmation signal, the protocol word is repeated twice, for example. If some of the addressed multiplex nodes have still not replied, the nodes which do not reply are excluded from the registration list which lists the active nodes. If, on the other hand, a node which has not been active until then should reply for the first time, the registration list is supplemented with this node which replies for the first time.

With such a configuration, the known transmission collision problem, in which two or more nodes try to transmit at essentially the same time, may occur. In order to solve this problem, a priority sequence for the transmission authorization has to be predefined in each node, the priority sequence blocking transmission access to nodes with lower priority for as long as nodes with higher priority are transmitting. Therefore, before each bus access each node checks whether a node with a higher priority is not already transmitting, which can lead to a certain delay in the transmission of signals. In addition, a change in the fixed priority sequence is also problematic because the change has to be registered selectively in the multiplex nodes. In addition, synchronization problems may occur if the aim is to synchronize the timing clock of the operation of the individual multiplex nodes. In such a case, additional synchronization is necessary.

SUMMARY OF THE INVENTION

In one embodiment of the invention, there is a method of data transmission, comprising: transmitting an interrogation signal in a polling mode from a superordinate control unit to function units via a data bus, and transmitting a confirmation signal by the function units which are functioning and do not have any information to send, and when a confirmation signal is not received from a function unit, the superordinate control unit outputs a command signal which addresses the function unit and selectively causes it to transmit data.

In one aspect of the invention, the interrogation signal is transmitted cyclically.

In another aspect of the invention, the function units comprise impact and/or vehicle occupant detection sensors of a motor vehicle occupant protection system.

In still another aspect of the invention, the function units comprise firing caps for firing vehicle occupant protection means of a motor vehicle occupant protection system.

In yet another aspect of the invention, the interrogation signal comprises first signal segment for transmitting a polling command and a second signal segment which adjoins the second signal segment and which includes a multiplicity of regular voltage pulses which alternate between high and low potential.

In another aspect of the invention, the function units transmit confirmation signals in the form of current pulses during low level phases of voltage pulses of the signal segment.

In yet another aspect of the invention, the command signal has the same structure as the interrogation signal, and an address signal segment is provided instead of the signal segment which predefines the polling mode.

In still another aspect of the invention, an addressed function unit transmits its information in the form of current pulses during low level phases of voltage pulses of the command signal which adjoin the address segment, and generate check bits which are transmitted to the superordinate control unit after the transmission of information during further low-level phases of the command signal.

In another embodiment of the invention, there is a superordinate control unit; and a plurality of function units which are connected to the control/unit via a common data bus, in which the superordinate control unit is configured to repeatedly transmit an interrogation signal to the function units via the data bus, the interrogation signal requesting the function units to acknowledge the confirmation signal, and when the confirmation signal of one of the plurality of function units is not received, the control unit outputs a command signal which addresses the function unit and which requests it to transmit an information signal to the control unit.

In another aspect of the invention, the function units have voltage regulators which are connected to the data bus on the input side and which generate the supply voltage for the respective function unit from the interrogation signals and command signals.

In still another embodiment of the invention, there is a superordinate control unit; and a plurality of function units which are connected to the control unit via a common data bus and in which an interrogation signal is transmitted in a polling mode from the superordinate control unit to the plurality of function units via the data bus, and a confirmation signal is transmitted by the function units which are functioning correctly and do not have any information to send, and when a confirmation signal is not received from one of the plurality of function units, the superordinate control unit outputs a command signal which addresses the function unit and selectively causes it to transmit data.

BRIEF DESCRIPTION OF THE DRAWINGS

The invention is described in more detail below by means of an exemplary embodiment and with reference to the drawings, in which.

DETAILED DESCRIPTION OF THE PREFERRED EMBODIMENTS

Figure 1:
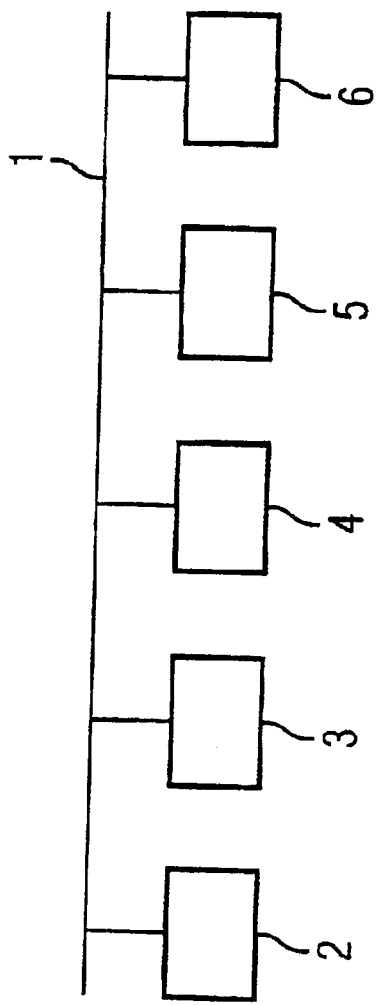
FIG. 1 shows a schematic block circuit diagram of an exemplary embodiment of the data transmission system.

The invention provides a data transmission method which permits efficient data transmission without collision problems.

The invention also discloses a data transmission system which is distinguished by efficient, collision-free transmission of data.

In the invention, the master/slave principle is used, the superordinate control unit performing the master function and exercising complete control of the data traffic on the data bus. Function units which are connected to the data bus are operated as slaves and interrogated repeatedly, preferably cyclically, in the polling mode. Function units which operate satisfactorily, and which do not emit any message, reply to each polling interrogation with a confirmation signal. If, however, the confirmation signal is not received from one or more function units, the superordinate control unit can address the function unit(s) in a targeted and selective fashion and provide them with the possibility of transmitting a respective message. This ensures that relatively rapid data transmission can take place without the risk of any collision problems. If a selectively addressed function unit does not transmit a message, this is an indication of a functional fault. Hence, the superordinate control unit can generate a corresponding fault message for rapid fault clearance, for example in the form of a visual or audible indication to the system user and/or in the form of a data entry in an operating monitoring protocol. Thus, not only is the data flow on the data bus selectively controlled in each case by the invention so that no collision problems occur, but a diagnostic function is also achieved at the same time.

When the invention is used in a motor vehicle, in particular a motor vehicle occupant protection system, the function units may be, for example, impact sensors or vehicle occupant detection sensors (seat occupation sensors). The function units can also alternatively or additionally be firing caps for firing vehicle occupant protection means or any other desired components. In each case, a multiple access of the function units to the data bus, and thus a possibility of a collision with a delayed transmission of signaling signals (for example sensor signals or sensor states) is avoided. The superordinate control unit determines the communications in each case. If the control system is a centralized one, the central control unit forms the superordinate control unit. In a decentralized system it is also possible for there to be a plurality of superordinate control units (masters) which each have selectively permanently assigned function units (slaves). In each case, a very rapid transmission of data is ensured.

The superordinate control unit can itself determine the priority sequence with which function units which do not reply during the polling mode are interrogated, and if appropriate also change the priority sequence at any time, for example as a function of the results of the seat occupation detection. In order to define priorities, and if appropriate change them, there is no need for intervention in the subordinate function units so that the priority sequence can be defined very rapidly and without additional data communication via the data bus. In addition, during the polling mode the subordinate function units (slaves) have to continuously actively reply. That is, they emit an OK message. The bus architecture is thus very well suited for a system with active function elements, in particular sensors.

In addition to the transmission of information, the supply energy can also be transmitted from the superordinate control unit to the function unit via the bus by virtue of the fact that the transmission protocol, i.e., the exchange of data between the master and the slaves, preferably operates in a bipolar fashion, i.e. changes between 0 and 1. In addition, the cyclical polling interrogation also continuously transmits a clock frequency so that the entire bus system can operate synchronously. In particular if there is a phase change at each bit of the polling command, the average value of the signal does not necessarily change during the data transmission so that energy can be made available continuously.

The function units preferably reply in their time window with current pulses, i.e., by appropriately loading the data bus with current so that the average value of the voltage is not varied, and at the same time the OK state is nevertheless reliably signaled to the superordinate control unit.

The function units consequently do not require any separate clock. If they nevertheless have separate a clock generating device, this can be triggered and synchronized by the "1" bits transmitted by the superordinate control unit. In addition, the supply of energy to the function units for their operation is even, which is also ensured by the sequence of "1" bits provided in the polling command.

The invention can be used in a sensor bus or a firing bus for vehicle occupant protection systems, or in any other desired bus system. In the two first-mentioned cases, the superordinate control unit is formed, for example, by a central airbag control unit which continuously maintains control over all the sensors and/or firing caps.

In the data transmission system shown in FIG. 1, there is a superordinate control unit 3 which is embodied as a central control unit and which controls the communication as a master unit. The control unit 3 is connected via a common data bus 1 to functions units 2, 4, 5 and 6 which are embodied as sensors. The function units can, however, also be firing caps or other control components or can be composed of a combination of sensors and firing caps or other elements. The data bus 1 is preferably embodied as a two-wire line and is used not only for transmitting data but also for supplying energy to the function units 2, 4, 5 and 6. The data bus can additionally also serve as a control bus, that is to say transmit control instructions.

The exemplary embodiment shown is embodied as a data transmission system of a motor vehicle occupant protection system in which the sensor 2 is used as a seat occupation sensor which detects whether the front passenger seat and/or the rear seats of the motor vehicle are actually occupied. A separate seat occupation sensor 2 is provided for each monitored seat. Because the seat occupation state generally does not change during the travel mode, the seat occupation state is interrogated at the start of the travel mode, and possibly at large time intervals, so that the frequency of sensor interrogations can be very low. Instead of seat occupation sensors 2, it is also possible to provide vehicle occupant detection sensors which are based on some other principle and which can detect the presence of passengers on the front passenger seat and/or the rear seats of the motor vehicle. This is used for suppressing the triggering of vehicle occupant protection device of seats which are not occupied, for example of airbags or seat belt pretensioning systems.

The sensors 4 to 6 are impact sensors for detecting an impact and the location of its action, and if appropriate the direction of its action. The sensors 4 to 6 are arranged in a known fashion at a central point on the motor vehicle and at the front, rear and/or sides of the motor vehicle, the number of sensors being variable depending on the design specifications. The sensors comprise the slave units of the superordinate control unit (master) 3.

Figure 2:
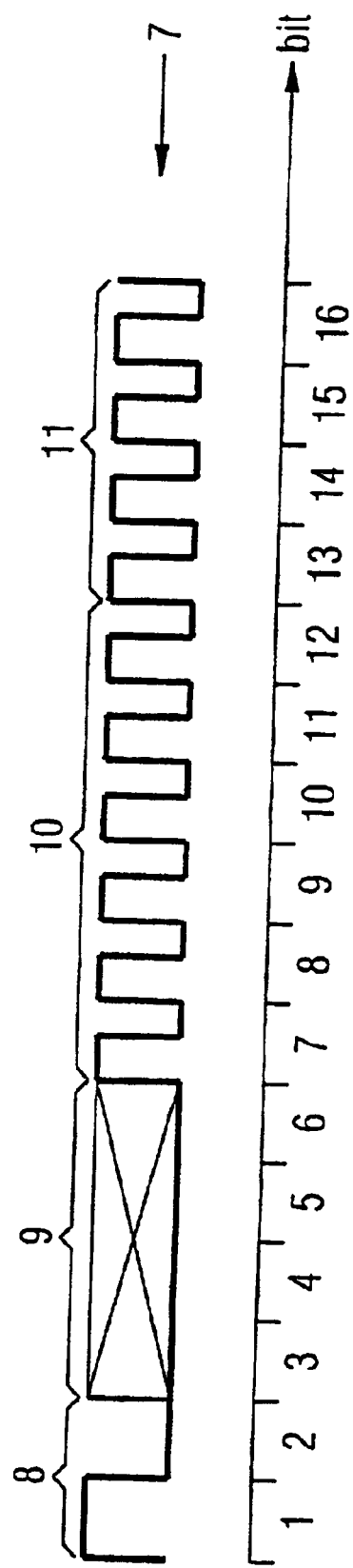
FIG. 2 shows the structure of the data words used for communication between the master and slave units.

FIG. 2 illustrates the structure of the data words 7 which are repeatedly emitted by the central control unit 3. These data words 7 are output quasi-permanently, at least during the travel mode of the motor vehicle after the minimum speed has been exceeded in order to trigger the vehicle occupant protection system when there is an accident. That is, the data words 7 are repeated cyclically in a fault-free situation without or with a short time interval. The data word 7 is a unipolar voltage signal whose voltage states change between a higher and a lower voltage value. This ensures that a voltage continues to be applied to the transmission line so that acknowledgement in the form of current pulses, for example by a simple impedance loading, is possible. According to FIG. 2, the data word is present in the form of a biphase code in which a "one" is signaled by phase change in the center of a bit, whereas a "0" is represented by a phase change at the end of a bit. The data word 7 is a 16-bit signal. The bit numbers are plotted on the bit axis illustrated underneath the data word 7.

Each data word 7 comprises the signal segments 8 to 11 shown in FIG. 2. The signal segment 8 is composed of two start bits, which signal the start of the data word and are represented by two zeros. This is followed by the signal segment 9 in which either a specific command, in particular a polling command, or an address of a function unit which is to be addressed, in particular of a sensor 2, 4, 5 or 6, is transmitted. The signal segment 9 here comprises the bits 3 to 6 of the data word. During the following signal segments 10 and 11 (bits 7 to 16) the control unit 3 transmits a sequence of logic "1" in the polling mode (in this case the polling command is predefined in the signal segment 9) so that a signal level change from "H" to "L" occurs in the center of each bit 7 to 16. The second half of each bit 7 to 16 therefore has a relatively low voltage level. During this low voltage level, the sensors which are connected to the data bus 1 can transmit back their OK messages to the control unit 3 in the form of current modulated pulses, the current modulation being caused by the data bus being loaded by the respectively transmitting sensor. For example, a sensor, i.e., the communications device provided in it, can connect a load resistor to the data bus 1 during the low level phase of the bit assigned to it from the data word 7 so that current loading of the data bus 1, detectable by the control unit 3 (master), is brought about. This current loading pulse comprises the "OK" message of the respective sensor. Each slave unit (2, 4, 5, 6) is selectively assigned a fixed bit during the polling mode, during which it can emit its status message, for example the bit "7" for the sensor 4, the bit "8" for the sensor 5, etc. Consequently, the data word 7 illustrated can be used to address slave units (bits 7 to 16) during the polling mode 10. The respective bits 7 to 16 of the data word 7 thus define the respective addresses of the slave units in the polling mode. If there are fewer slave units than bits present in the signal segments 10 and 11, two or more bits for making acknowledgments can be made available to one, more or if appropriate even all the slave units so that they can emit more detailed acknowledgements, for example "OK", "urgent message", "normal message" and the like. One or more of these bits can then serve in each case as a checkbit/checkbits for the acknowledgement.

During the polling mode, the slave units therefore reply actively in their time window (by means of a current pulse) and as a result signal their satisfactory state (no internal function faults, no impact, there is no other message to emit). However, if a slave unit is faulty or wishes to transmit a message to the master unit in a targeted fashion, the slave unit signals this to the master unit by failing to emit a loading pulse during the bit assigned to it during the polling mode. The master unit 3 detects this absence of an acknowledgement from the slave unit and changes from the polling mode to selective addressing of the slave unit which does not reply. In this case, the address which is assigned to the slave unit which does not reply is then transmitted in the next data word 7 in the signal segment 9 instead of a polling command. Because the other slave units are neither addressed by means of a polling command nor by means of their own address, they remain silent, i.e., they do not transmit any information during the signal segments 10 and 11. The master unit 7 generates the signal segment 10 which adjoins the address 9, so that the profile shown in FIG. 2 is also obtained. However, the bits 7 to 12 (low level phases) are then available for the addressed slave unit so that the latter can transmit a multibit message to the master unit. The slave unit can, for example, transmit a data word, a measuring level or status information which signals, for example, a crash has been detected (for example an acceleration limiting value has been exceeded, or the strength of the measured acceleration).

A slave unit can therefore very quickly emit its sensor information without collision problems by virtue of the fact that it merely fails to transmit an OK message during the next polling command and is then selectively addressed by the master unit which then fails to generate a polling command but instead generates the corresponding address in the signal segment 9 of the next data word 7, after which it can transmit its information in the form of a multibit word.

However, if the selectively addressed slave unit does not make available any reasonable information during the bits 7 to 12, this is classified by the master unit as an operational fault of the slave unit (no "OK" message during a polling command, no evaluable information during the selective addressing of the slave unit). Such a slave unit which is detected as faulty can be gated out during the following polling mode, i.e., is not checked once more after each polling command. A status enquiry or communication then takes place with the other slave units.

This transmission authorization control avoids a situation in which a plurality of slave by units can access the bus simultaneously, with the result that there is no risk of a collision. At the same time there is the advantage that the master unit does not have to receive any asynchronously transmitted slave signals so that it is possible to dispense with interrupt handling routines which are otherwise necessary. The master unit is aware in each case of those times at which the (preferably current-modulated) slave signals are to be expected.

Furthermore, it is advantageous that the slave units do not require their own clock because they can be clocked by the clock of the master unit. If the slave units nevertheless have their own clock generating device, this can be triggered and/or synchronized at any time by the "ones" transmitted by the master unit. The clock frequency is continuously transmitted by the master unit on the basis of the data word forming device 7, and can thus bring about the synchronization of the entire bus system.

If the address of a single slave unit is transmitted in the signal segment 9, the bits in the signal segment 11 (bits 13 to 16) are used to transmit checkbits, for example a fault detection and/or correction code, for example CRC4. The master unit itself does not generate a separate error check code in this case but rather generates the bits of the signal segment 11 with the profile shown in FIG. 2, that is to say in an identical way to the transmission of a polling command. However, the addressed slave unit is programmed in such a way that it carries out, for example according to the CRC method, a fault detection routine by its own address and also the information which is generated by it and is to be transmitted to the master unit in the low level phases of the signal segment 10. The fault detection word and/or fault correction word formed is transmitted to the master unit in the low level phases of the signal segment 11. The master unit checks the checkbits received in the signal segment 11, taking into account the slave address (in the signal segment 9) generated by it and the slave information (in the low level phases of the signal segment 10) received by it, and on the basis of the fault check which is known and used in the slave unit. If, for example, the checksum formed differs from the checksum transmitted by the slave unit, this indicates a fault either in the transmission or in the connected slave unit. In the event of the detection of a fault, suitable fault clearance routines can be carried out, for example transmitting the selectively addressed data word 7 once more from the master unit to the data bus 1 in order to cause the addressed slave unit to generate signals once more.

During the polling interrogation, a situation may also occur in which two or more slave units do not reply with their response signal (current pulse in the assigned bit) because they want, for example, to transmit simultaneously or are connected to the bus in a faulty way, or not at all. In such a case, the master unit can define in what sequence it interrogates the non-replying slave units, on the basis of a priority sequence which is stored in it or generated. The priority sequence can be variable as a function of further parameters, for example the seat condition status. Because only the master unit includes and defines the priority sequence, a priority change can be carried out without difficulty and extremely rapidly. If, for example, two side impact sensors on the front door and the rear door reply simultaneously by failing to transmit an OK signal, the sequence of the interrogation can be defined, for example, as a function of whether the rear seat is unoccupied. If the rear seat is not occupied, the sensor signal of the side impact sensor of the rear door can either be completely ignored or interrogated only after the sensor signal of the front impact sensor, and appropriately evaluated.

Thus, by virtue of the fact that the master unit does not always continuously have control of the entire data bus 1 but can also update the priorities during the interrogation of the function units at any time, the data communication can be optimized taking into account the current conditions, for example the seat occupation conditions or the like, and nevertheless a very rapid transmission of information from a slave unit to the master unit is still ensured at all times.

In the protocol according to FIG. 2, a maximum of 10 slave units can be connected to the data bus 1. In this case, a slave unit can output its information in a time interval of 256 microseconds to 512 microseconds given a transmission rate of 125 kbaud.

If a higher number of slave units is desired, it is possible, for example, to expand the protocol length to 24 bits, in which case the following bit assignment can be provided: 3 start bits in the signal segment 8; 5 command or address bits in the signal segment 9; and 16 information bits in the signal segments 10 and 11. In this case, the transmission of a slave information item at the above-mentioned transmission rate of 125 kbaud can last between 384 microseconds and 768 microseconds. If more rapid transmission is required, the transmission rate can be increased. If it is doubled to 250 kbaud, the transmission of an information item from a slave unit then takes between 192 microseconds and 384 microseconds.

The voltage signal profile of the communication protocol shown in FIG. 2 also simultaneously ensures a continuous supply of energy to the slave units. The average value of the voltage supply does not change during the data transmission because there is a phase change at each bit. The slave units are preferably provided with a voltage regulator which is connected to the data bus 1 on the input side and which outputs the constantly regulated supply voltage for the respective slave unit on the output side.

What is claimed is:

1. A method of data transmission, comprising: transmitting an interrogation signal in a polling mode from a superordinate control unit to function units via a data bus; and transmitting a confirmation signal by the function units which are functioning and do not have any information to send, and when a confirmation signal is not received from a function unit, the superordinate control unit outputs a command signal which addresses the function unit and selectively causes it to transmit data.

2. The method as claimed in claim 1, wherein the interrogation signal is transmitted cyclically.

3. The method as claimed in claim 1, wherein the function units comprise impact and/or vehicle occupant detection sensors of a motor vehicle occupant protection system.

4. The method as claimed in claim 1, wherein the function units transmit confirmation signals in the form of current pulses during low level phases of voltage pulses of the signal segment.

5. The method as claimed in claim 1, wherein the command signal has the same structure as the interrogation signal, and an address signal segment is provided instead of the signal segment which predefines the polling mode.

6. The method as claimed in claim 5, wherein an addressed function unit transmits its information in the form of current pulses during low level phases of voltage pulses of the command signal which adjoin the address segment, and generate check bits which are transmitted to the superordinate control unit after the transmission of information during further low-level phases of the command signal.

7. A data transmission system, comprising:
a superordinate control unit; and
a plurality of function units which are connected to the control/unit via a common data bus, in which the superordinate control unit is configured to repeatedly transmit an interrogation signal to the function units via the data bus, the interrogation signal requesting the function units to acknowledge the confirmation signal, and when the confirmation signal of one of the plurality of function units is not received, the control unit outputs a command signal which addresses the function unit and which requests it to transmit an information signal to the control unit.

8. The data transmission system as claimed in claim 7, wherein the function units have voltage regulators which are connected to the data bus on the input side and which generate the supply voltage for the respective function unit from the interrogation signals and command signals.

9. A data transmission system, comprising:
a superordinate control unit; and
a plurality of function units which are connected to the control unit via a common data bus and in which an interrogation signal is transmitted in a polling mode from the superordinate control unit to the plurality of function units via the data bus, wherein
a confirmation signal is transmitted by the function units which are functioning correctly and do not have any information to send, and
when a confirmation signal is not received from one of the plurality of function units, the superordinate control unit outputs a command signal which addresses the function unit and selectively causes it to transmit data.

10. The data transmission system as claimed in claim 9, wherein the function units comprise firing caps for firing vehicle occupant protection means of a motor vehicle occupant protection system.

11. The data transmission system as claimed in claim 9, wherein the interrogation signal comprises first signal segment for transmitting a polling command and a second signal segment which adjoins the second signal segment and which includes a multiplicity of regular voltage pulses which alternate between high and low potential.

* * * * *